(12) United States Patent
Guan

(10) Patent No.: US 12,321,003 B2
(45) Date of Patent: Jun. 3, 2025

(54) BACKLIGHT MODULE AND DISPLAY DEVICE

(71) Applicant: TCL CHINA STAR OPTOELECTRONICS TECHNOLOGY CO., LTD., Shenzhen (CN)

(72) Inventor: Zhonghong Guan, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/772,211

(22) PCT Filed: Apr. 12, 2022

(86) PCT No.: PCT/CN2022/086319
§ 371 (c)(1),
(2) Date: Apr. 27, 2022

(87) PCT Pub. No.: WO2023/178741
PCT Pub. Date: Sep. 28, 2023

(65) Prior Publication Data
US 2024/0142691 A1 May 2, 2024

(30) Foreign Application Priority Data
Mar. 22, 2022 (CN) .......................... 202210287890.3

(51) Int. Cl.
*F21V 8/00* (2006.01)
*G02F 1/13357* (2006.01)

(52) U.S. Cl.
CPC ......... *G02B 6/0031* (2013.01); *G02B 6/0068* (2013.01); *G02F 1/133605* (2013.01)

(58) Field of Classification Search
CPC ........................... G02B 6/0031; G02B 6/0068
See application file for complete search history.

(56) References Cited

U.S. PATENT DOCUMENTS

2019/0049651 A1* 2/2019 Yamamoto .......... H01L 25/0753

FOREIGN PATENT DOCUMENTS

| CN | 104714331 A | 6/2015 |
|----|-------------|--------|
| CN | 205899068 U | 1/2017 |

(Continued)

OTHER PUBLICATIONS

PCT International Search Report for International Application No. PCT/CN2022/086319, mailed on Nov. 25, 2022, 10pp.

(Continued)

*Primary Examiner* — Chad H Smith
(74) *Attorney, Agent, or Firm* — The Roy Gross Law Firm, LLC; Roy D. Gross

(57) ABSTRACT

Embodiments of the present disclosure are directed to a backlight module and a display device. The backlight module includes a light source component, a reflecting cover, and a light guide plate. The light source component includes a light source substrate and a plurality of light-emitting units disposed on the light source substrate. The reflecting cover has a plurality of separated accommodating cavities, each of which is disposed in one of the accommodating cavities. The light-emitting units and the reflecting cover are located on one side of the light source substrate near the light guide plate. The light emitted by each of the light-emitting units is reflected to the light guide plate by the reflecting cover.

14 Claims, 4 Drawing Sheets

(56) References Cited

FOREIGN PATENT DOCUMENTS

| | | | | |
|---|---|---|---|---|
| CN | 107300808 | A | 10/2017 | |
| CN | 206805079 | U * | 12/2017 | ......... G02F 1/13357 |
| CN | 211149134 | U | 7/2020 | |
| CN | 111722435 | A | 9/2020 | |
| CN | 215867453 | U * | 2/2022 | ......... G02F 1/13357 |
| CN | 216083347 | U | 3/2022 | |
| JP | 2007026740 | A | 2/2007 | |
| WO | 2020189857 | A1 | 9/2020 | |

OTHER PUBLICATIONS

PCT Written Opinion of the International Search Authority for International Application No. PCT/CN2022/086319, mailed on Nov. 25, 2022, 7pp.

Chinese Office Action issued in corresponding Chinese Patent Application No. 202210287890.3 dated Nov. 29, 2022, pp. 1-6, 17pp.

\* cited by examiner

BACKLIGHT MODULE AND DISPLAY DEVICE

CROSS REFERENCE TO RELATED APPLICATIONS

This application is a National Phase of PCT Patent Application No. PCT/CN2022/086319, having International filing date of Apr. 12, 2022, which claims the benefit of priority of Chinese Patent Application No. 202210287890.3, filed Mar. 22, 2022, the contents of which are all incorporated herein by reference in their entirety.

FIELD OF THE INVENTION

The present disclosure relates to the field of display technology, more particularly, to a backlight module and a display device.

BACKGROUND

As a communication interface between users and information, the display device has become the mainstream display method because of its high space utilization, low electromagnetic interference, and no radiation. It is widely used in information communication tools such as TV, smartphone, tablet, etc. The liquid crystal module of the display device does not emit light, and a light source is provided for the liquid crystal module by the backlight module. The backlight module of the display device is mainly classified into a type of direct backlight module and a type of side-in backlight module. The backlight module is used to convert a point or line light source into a planar light source, wherein the planar light source converted from each of the light-emitting units is scattered across a light guide plate.

Technical Problem

When multiple light-emitting units are turned on at the same time, the area illuminated by each light-emitting unit on the light guide plate may be interfered with by light from other light-emitting units, resulting in uneven brightness of the light source provided by the backlight module. Especially, when area dimming is applied to the display device, the area illuminated by one of the light-emitting units in the area may be affected by the light emitted by the light-emitting units outside the area, thereby reducing the contrast of the light generated by the backlight module.

SUMMARY

Technical Solution

Embodiments of the present disclosure are directed to a backlight module and a display device. By disposing a reflecting cover in the backlight module, it is capable of effectively improving the brightness uniformity and contrast of the light generated by the backlight module.

An embodiment of the present disclosure is directed to a backlight module. The backlight module comprises a light source component, a reflecting cover, and a light guide plate. The light source component comprises a light source substrate and a plurality of light-emitting units disposed on the light source substrate. The reflecting cover has a plurality of separated accommodating cavities. Each of the light-emitting units is disposed in one of the accommodating cavities. The accommodating cavities are one to one corresponding to the light-emitting units. The light-emitting units and the reflecting cover are located on one side of the light source substrate near the light guide plate, and an interval is provided between the light guide plate and the light source substrate. The light emitted by each of the light-emitting units is reflected to the light guide plate by the reflecting cover.

Another embodiment of the present disclosure is directed to a display device. The display device includes a backlight module and a liquid crystal module that is disposed above the backlight module and configured to receive the light from the backlight module. The backlight module comprises a light source component, a reflecting cover, and a light guide plate. The light source component comprises a light source substrate and a plurality of light-emitting units disposed on the light source substrate. The reflecting cover has a plurality of separated accommodating cavities. Each of the light-emitting units is disposed in one of the accommodating cavities. The accommodating cavities are one to one corresponding to the light-emitting units. The light-emitting units and the reflecting cover are located on one side of the light source substrate near the light guide plate, and an interval is provided between the light guide plate and the light source substrate. The light emitted by each of the light-emitting units is reflected to the light guide plate by the reflecting cover.

Advantageous Effect

The embodiment of the present disclosure provides a backlight module and a display device. The backlight module comprises a light source component, a reflecting cover, and a light guide plate. The light source component comprises a light source substrate and a plurality of light-emitting units disposed on the light source substrate. The reflecting cover has a plurality of separated accommodating cavities. Each of the accommodating cavities can accommodate one light-emitting unit, and the reflecting cover is capable of reflecting the light from light-emitting unit. By disposing the separated accommodating cavities in the reflecting cover, the light emitted by multiple light-emitting units does not interfere with each other. It is understandable that, on the first aspect, the light from the light-emitting units after entering the light guide plate 3 do not interfere with each other during the transmission of the light guide plate, thereby avoiding that the area illuminated by the light-emitting unit in the light guide may be interfered by the light generated by other light-emitting units, and thus the uniformity of the light source provided by the backlight module is improved. On the second aspect, when area dimming is applied to the display device, an area in the light guide plate which is illuminated by the light-emitting unit provided in the area will not be affected by the light emitted by the light-emitting unit outside the area, thereby improving the contrast of the light generated by the backlight module.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

For a more complete understanding of the present disclosure and its beneficial effects, the following description will be made with reference to the accompanying drawings. Here, the same reference numerals denote the same parts in the following description.

DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

As a communication interface between users and information, the display device has become the mainstream display method because of its high space utilization, low electromagnetic interference, and no radiation. It is widely used in information communication tools such as television, smartphone, tablet, etc. The liquid crystal module of the display device does not emit light, and a light source is provided for the liquid crystal module by the backlight module.

The backlight module of the display device is mainly classified into a type of direct backlight module and a type of side-in backlight module. The backlight module is used to convert a point or line light source into a planar light source, wherein the planar light source converted from each of the light-emitting units is scattered across the light guide plate. However, when multiple light-emitting units are turned on at the same time, the area illuminated by each light-emitting unit on the light guide plate may be interfered with by light from other light-emitting units, resulting in uneven brightness of the light source provided by the backlight module. Especially, when area dimming is applied to the display device, the area illuminated by one of the light-emitting units in the area may be affected by the light emitted by the light-emitting unit outside the area, thereby reducing the contrast of the light generated by the backlight module.

Embodiments of the present disclosure are directed to a backlight module and a display device, which is capable of improving the brightness uniformity and contrast of the light generated by the backlight module. A detailed description is given below in conjunction with the accompanying drawings.

Figure 1:
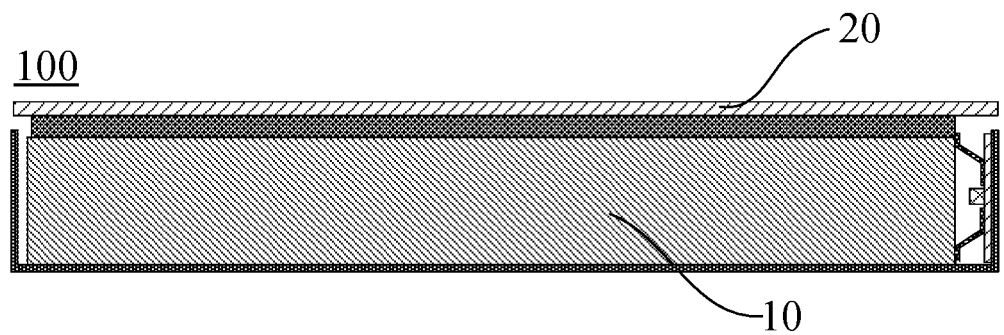
FIG. 1 is a schematic diagram of a display device according to one embodiment of the present disclosure.

Please refer to FIG. 1. FIG. 1 is a schematic diagram of a display device according to one embodiment of the present disclosure.

The display device 100 comprises a backlight module 10 and a liquid crystal module 20. The liquid crystal module 20 is disposed above the backlight module 10. The backlight module 10 can generate light and direct it toward a liquid crystal screen of the liquid crystal module 20 to achieve image display function of the liquid crystal screen.

The display device 100 may be any device or component with display function such as liquid crystal module 20, electronic paper, mobile phone, tablet, TV, monitor, notebook computer, digital photo frame, navigator, etc.

Figure 2:
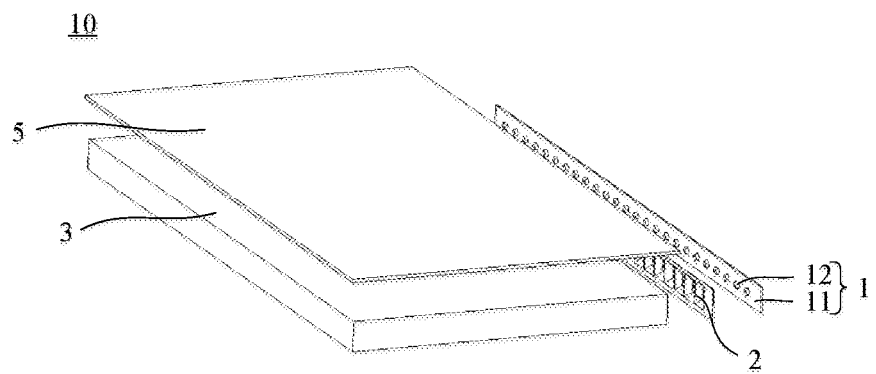
FIG. 2 is an exploded diagram of a backlight module according to one embodiment of the present disclosure.
Figure 3:
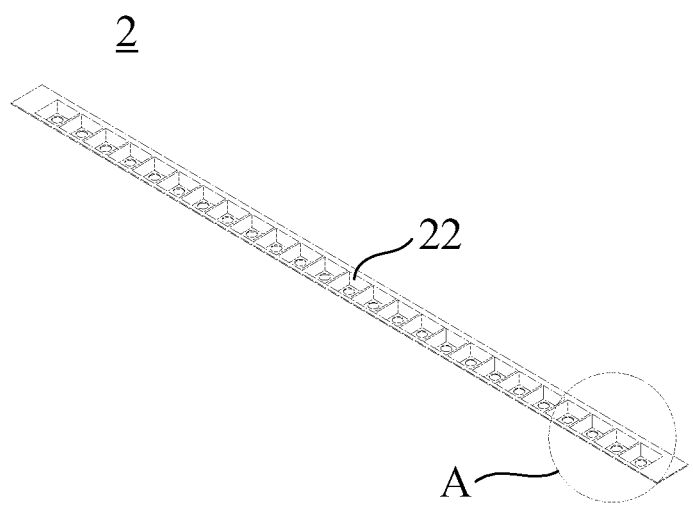
FIG. 3 is a schematic diagram of a reflecting cover according to one embodiment of the present disclosure.
Figure 4:
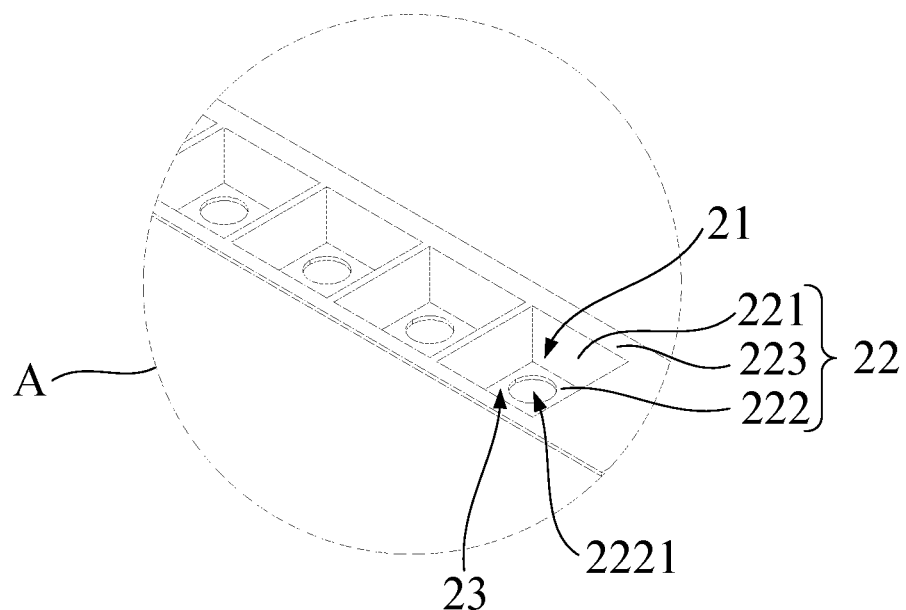
FIG. 4 is an enlarged view of a partial area A in FIG. 3.

Please refer to FIG. 2 to FIG. 4. FIG. 2 is an exploded schematic diagram of a backlight module according to one embodiment of the present disclosure. FIG. 3 is a schematic diagram of a reflecting cover according to one embodiment of the present disclosure. FIG. 4 is a schematic enlarged view of a partial area A in FIG. 3.

The backlight module 10 comprises a light source component 1, a reflecting cover 2, and a light guide plate 3. The light source component 1 comprises a light source substrate 11 and a plurality of light-emitting units 12 disposed on the light source substrate 11. The reflecting cover has a plurality of separated accommodating cavities 21. Each of the light-emitting units 12 is disposed in one of the accommodating cavities 21. The accommodating cavities 21 are one to one corresponding to the light-emitting units 12. The light emitted by each of the light-emitting units 12 is reflected to the light guide plate 3 by the reflecting cover 2.

The light source substrate 11 may be a Printed Circuit Board (PCB). When the light source substrate 11 is a PCB, the light-emitting unit 12 can emit light upon receiving electrical signal provided by the circuit on the PCB. The light source substrate 11 may be shaped as a rectangle. The light-emitting units 12 can be distributed in an array on the light source substrate 11 or can be customized by the user according to their own needs. For example, the light-emitting units 12 can be arranged in sequence along the length direction of the light source substrate 11 to present a "—" shaped arrangement.

The light-emitting unit 12 comprises at least one lamp bead. For example, the light-emitting unit 12 comprises one or two lamp beads. When the light-emitting unit 12 comprises two lamp beads, one reflecting cover 2 is covering at the two lamp beads, and the light emitted by the two lamp beads can be reflected by the reflecting cover 2 to enter the light guide plate 3. When the light-emitting unit 12 comprises one light bead, the light emitted by the light bead can be reflected by the reflecting cover 2 to enter the light guide plate 3.

There are at least two ways to dispose multiple separated accommodating cavities on the reflecting cover 2. First way is to form the reflecting cover 2 by connecting a plurality of shell bodies 22 in sequence. Each of the shell bodies 22 has an accommodating cavity 21. Second way is to dig holes or grooves in reflecting cover 2 to form a plurality of separated accommodating cavities 21. Optionally, an opening 23 of each of the accommodating cavities 21 are disposed on the same side of the reflecting cover 2, so that the light emitted by the light-emitting units 12 in the accommodating cavities 21 goes in the same direction.

The light guide plate 3 has a very high refractive index and no light absorption. When the light goes to a light incident face 31 of the light guide plate 3 and enters each light guide point of the light guide plate 3, the light diffuses further at all angles and then emits from a light exiting face 32 of the light guide plate 3. Because of the existence of light guide points of different dense and size in the light guide plate 3, it can make the light guide plate 3 glow uniformly. The light incident face 31 and the light exiting face 32 of the light guide plate 3 are defined according to the use of the light guide plate 3. One face of the light guide plate 3 into which the light emitted from the light-emitting units 12 enters is called the light incident face 31. The other face of the light guide plate 3 from which the light leaves is called the light exiting face 32. The light leaving from the light exiting face 32 can enter the liquid crystal module 20.

The embodiment of the present disclosure provides a backlight module 10 and a display device 100. The backlight module 10 comprises a light source component 1, a reflecting cover 2, and a light guide plate 3. The light source component 1 comprises a light source substrate 11 and a plurality of light-emitting units 12 disposed on the light source substrate 11. The reflecting cover 2 has a plurality of separated accommodating cavities 21. Each of the accommodating cavities 21 can accommodate one light-emitting unit 12, and the reflecting cover 2 is capable of reflecting the light from light-emitting unit 12. By disposing the separated accommodating cavities 21 in the reflecting cover 2, the light emitted by multiple light-emitting units 12 does not interfere with each other. It is understandable that, on the first aspect, the light from the light-emitting units 12 after entering the light guide plate 3 do not interfere with each other during the transmission of the light guide plate 3, thereby avoiding that the area illuminated by the light-emitting unit 12 in the light guide 3 may be interfered by the light generated by other light-emitting units 12, and thus the uniformity of the light source provided by the backlight module 10 is improved. On the second aspect, when area dimming is applied to the display device 10, an area in the light guide plate which is illuminated by the light-emitting unit 12 provided in the area will not be affected by the light emitted by the light-emitting unit 12 outside the area, thereby improving the contrast of the light generated by the backlight module 10.

Figure 5:
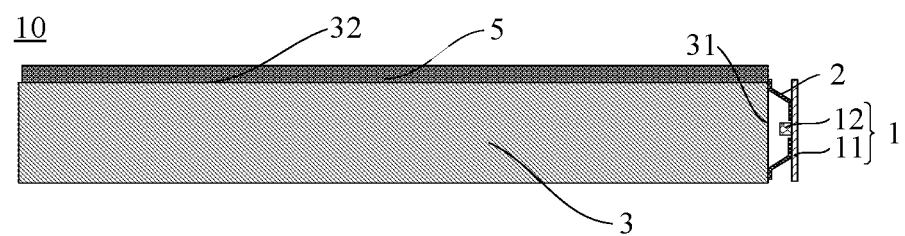
FIG. 5 is the first schematic diagram of the backlight module according to one embodiment of the present disclosure.

Please refer to FIG. 5. FIG. 5 is the first schematic diagram of the backlight module according to one embodiment of the present disclosure. The light source component 1 can be disposed at one side of the light guide plate 3 or on multiple sides of the light guide plate 3. For example, when the light guide plate 3 is a cube, the light guide plate 3 comprises a bottom face, a top face opposite to the bottom face, and the first side surface, the second side surface, the third side surface, and the fourth side connected sequentially to the bottom face and the top face. For example, the light source component 1 can only be disposed at the first side surface, and the first side surface is used as the light incident face 31 of the light guide plate 3. The number of the light source component 1 can be multiple. Multiple light source components 1 are respectively disposed at the first side surface, the second side surface, the third side surface, and the fourth side surface, so that the first side surface, the second side surface, the third side surface, and the fourth side surface are used as the light incident face 31 of the light guide plate 3.

When the type of the backlight module 10 is a direct type, the light source component 1 is disposed at the side of the bottom face of the light guide plate 3 near the light source component 1, with the bottom face as the light incident face 31 of the light guide plate 3, and the top face as the light exiting face 32 of the light guide plate 3. When the type of the backlight module 10 is a side-in type, the light source component 1 is disposed at one side of the first side surface of the light guide plate 3 near the light source component 1, the first side surface is used as the light incident face 31 of the light guide plate 3, and the top or bottom side is used as the light exiting face 32 of the light guide plate 3.

As shown in FIG. 2 and FIG. 5, an optical film 5 is attached to the light guide plate 3, so that the light emitted by the light-emitting units 12 is reflected or refracted by the light guide plate 3 and the optical film 5, thereby illuminating the liquid crystal module 20.

When the type of the backlight module 10 is a direct type, the light source substrate 11 is relatively disposed to the bottom face of the light guide plate 3, with the bottom face of the light guide plate 3 as the light incident face 31, and the top face of the light guide plate 3 as the light exiting face 32. In addition, the optical film 5 can be attached to the first side surface, the second side surface, the third side surface, and the fourth side surface of the light guide plate 3 to make the light emitted by the light-emitting units 12 reflect or refract through the light guide plate 3 and the optical film 5 and then emit evenly, thereby illuminating the liquid crystal module 20.

When the type of the backlight module 10 is a side-in type, the light source substrate 11 is relatively disposed to the side surface of the light guide plate 3, with the side surface of the light guide plate 3 as the light incident face 31, and the top face of the light guide plate 3 as the light exiting face 32. In addition, an optical film 5 can be attached to the bottom face of the light guide plate 3, so that the light emitted by the light-emitting units 12 reflects or refracts through the light guide plate 3 and the optical film 5 and then emits evenly from the top surface, thereby illuminating the liquid crystal module 20.

Figure 6:
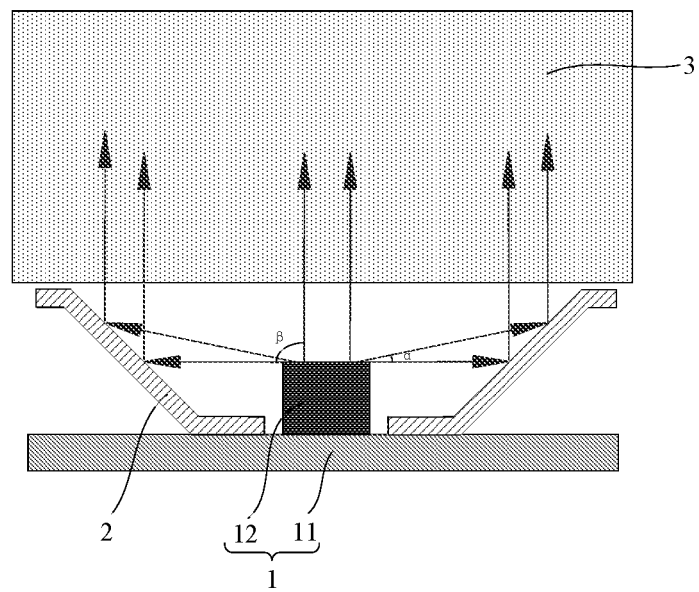
FIG. 6 is a schematic diagram of a light source component and a reflecting cover according to one embodiment of the present disclosure.
Figure 7:
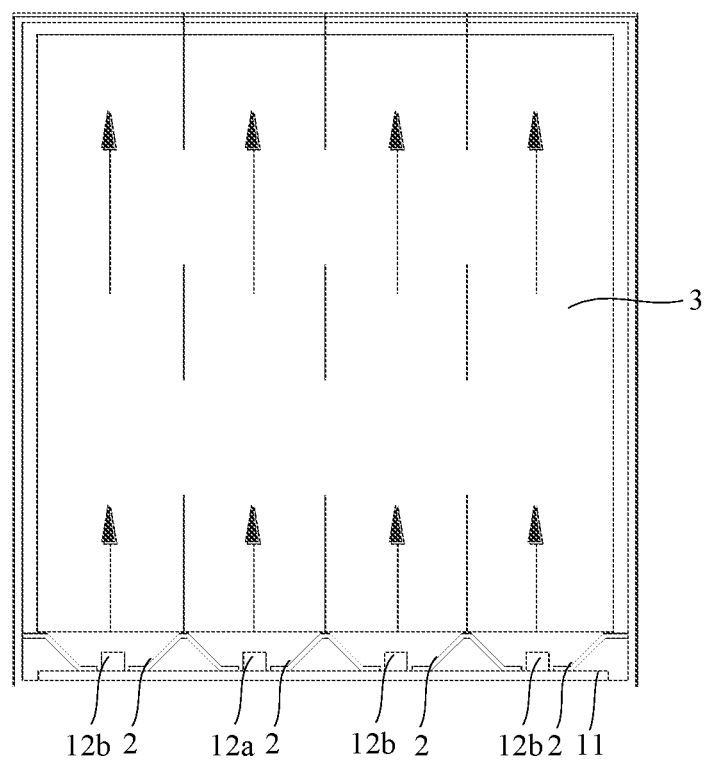
FIG. 7 shows the light path in the backlight module according to one embodiment of the present disclosure.

Please refer to FIG. 6 and FIG. 7. FIG. 6 is a schematic diagram of a light source component and a reflecting cover according to one embodiment of the present disclosure. FIG. 7 shows the light path in the backlight module according to one embodiment of the present disclosure. The reflecting cover 2 is capable of reflecting the light emitted by the light-emitting units 12. For example, the light emitted from the light-emitting units 12 presenting a first angle α in relative to the light source substrate 11 is reflected by the reflecting cover 2, and the light emitted from the light-emitting units 12 presenting a second angle β in relative to the light source substrate 11 enters the light guide plate 3 directly. Wherein, the first angle α is less than the second angle β.

When the backlight module 10 operates in the display device 100, if the user needs to apply area dimming to the display device 100, that is, the light intensity of one part of the light-emitting units 12 (recorded as the first light-emitting unit 12a) is low, and the light intensity of the other part of the light-emitting units 12 (recorded as the second light-emitting unit 12b) is high. Because the reflecting cover 2 is disposed in the backlight module 10, the light generated by each of the light-emitting units 12 can be independent to each other, so that the light generated by the light-emitting unit 12b which needs a higher light intensity will not interfere with the light generated by the light-emitting unit 12a which needs a lower light intensity when the user applies area dimming.

Please continue to refer to FIG. 4. The reflecting cover 2 comprises a plurality of shell bodies 22, each of the shell bodies 22 comprises a plurality of side walls 221. The side walls 221 are enclosed with the light source substrate 11 to form the accommodating cavities 21. The light emitted by each of the light-emitting units 12 is reflected to the light guide plate 3 by the corresponding side walls 221 of the shell bodies 22. For example, the number of the side walls 221 is four, the four side walls 221 are connected in sequence to form a prism. The light-emitting unit 12 is disposed in the accommodating cavity 21 formed by the four side walls 221, and the light emitted by the light-emitting units 12 is reflected by the side walls 221.

In the direction from the light-emitting unit 12 to the light guide plate 3, the area of the cross section of the accommodating cavity 21 increases gradually, such as the trumpet shape. Understandably, the area of the cross section of the accommodating cavity 21 increases gradually, so that the area of the light guide plate 3 acting on the light-emitting units 12 is larger, which is conducive to improving the effective light efficiency. Optionally, an area of the cross section of the accommodating cavity 21 is a circle or rectangle in the direction from the light-emitting unit 12 to the light guide plate 3. For example, when the accommodating cavity 21 is truncated, the cross section of the accommodating cavity 21 is a circle. When the accommodating cavity 21 is a prism, the cross section of the accommodating cavity 21 is a rectangle. In some embodiments, please continue to refer to FIG. 7, the shell body 22 further comprises a bottom wall 222, the side walls 221 are disposed at the side of the bottom wall 222 away from the light source substrate 11. The bottom wall 222 is connected to the side walls 221 to form the accommodating cavity 21. A preset angle is present between the side wall 221 and the bottom wall 222. For example, the preset angle between the side wall 221 and the bottom wall 222 can be 30, 60, or 90 degrees. The bottom wall 222 is connected to the light source substrate 11, so that the reflecting cover 2 is capable of being fixed on the light source substrate 11. The bottom wall 222 is provided with a through hole 2221, and the light-emitting unit 12 is disposed through the through hole 2221.

Each of the side walls 221 has the same angle in relative to the side surface of the light guide plate 3 near the light-emitting unit 12. Because the light generated by the light-emitting unit 12 is symmetrically divergent, each of the side walls 221 has the same angle in relative to the side surface of the light guide plate 3 near the light-emitting unit 12, so that when the light generated by the light-emitting unit 12 is reflected by the side walls 221 of the shell body 22, the angles of the different reflected lights entering the light guide plate 3 are the same, which facilitates the transmission paths of the light emitted by the multiple light-emitting units 12 in the light guide plate 3 to be separated from each other.

The bottom wall 222 may be a circle or rectangle. Understandably, in some cases, when the shell body 22 can be cylindrical, truncated, or trumpet shaped, the bottom wall 222 is a circle. In other cases, when the shell body 22 can be prismatic or prism shaped, the bottom wall 222 is a rectangle. The bottom wall 222 can be connected to the light source substrate 11 by welding, clamping, or sticking.

Please continue to refer to FIG. 4. The through hole 2221 of the bottom wall 222 can be set at the very center of the bottom wall 222. When the side walls 221 are symmetrical centered on the light-emitting unit 12, the side walls 221 have the same reflection effect on the light generated by the light-emitting units 12.

The assembly process of the light guide plate 3, the light source component 1, and the reflecting cover 2 can comprise: installing the light guide plate 3 first, installing the reflecting cover 2 on the side surface of the light source component 1 having the light-emitting units 12, and finally fitting the light guide plate 3 and the light source component 1 correspondingly. By means of this process, each of the light-emitting units 12 is disposed in the accommodating cavity 21 formed by the side walls 221 and the bottom wall 222 of the reflecting cover 2, and every reflecting cover 2 reflects the light emitted by the light-emitting unit 12 into the light guide plate 3.

In the above embodiments, the side wall 221 can be a plane or an arc. Understandably, in some cases, when the shell body 22 is cylindrical, truncated, or trumpet shaped, the bottom wall 222 is a circle and the side wall 221 is an arc. When the shell body 22 is prismatic or prism shaped, as shown in FIG. 7, the bottom wall 222 is a rectangle, and the side wall 221 can be a plane or an arc, such as an inner concave arc or an outer convex arc.

Figure 8:
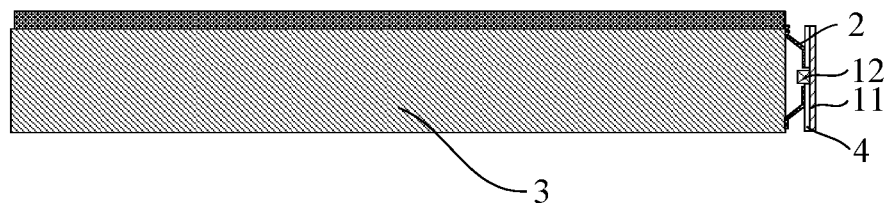
FIG. 8 is the second schematic diagram of the backlight module according to one embodiment of the present disclosure.

Please refer to FIG. 8. FIG. 8 is the second schematic diagram of the backlight module according to one embodiment of the present disclosure. The thickness of the side walls 221 increases gradually from one side away from the light source substrate 11 to one side close to the light source substrate 11. Due to the high thermal conductivity of the metal, when the material of the shell body 22 is metal, and the thickness of the side walls 221 of the shell body 22 increases, it is advantageous for the reflecting cover 2 to disperse the heat generated by the light-emitting unit 12 in time and prolong the life of the backlight module 10.

Refer to FIG. 4. The shell body 22 is provided with an opening 23 connected to the accommodating cavity 21. The shell body 22 also comprises a peripheral portion 223. The peripheral portion 223 is connected to the side walls 221. The peripheral portion 223 is disposed at the edge of the opening 23. The peripheral portion 223 is parallel to the side surface of the light guide plate 3 near the light-emitting unit 12. The peripheral portion 223 is abutted against the light guide plate 3. It is understandable that in order to increase the contact area between the shell body 22 and the light guide plate 3, the reflecting cover 2 is provided with the peripheral portion 223 so as to increase the contact area with the light guide plate 3, thereby reducing pressure and avoiding damage to the light guide plate 3.

Figure 9:
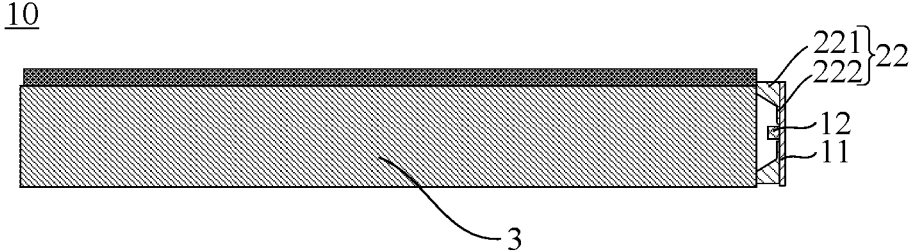
FIG. 9 is the third schematic diagram of the backlight module according to one embodiment of the present disclosure.

Please refer to FIG. 9. FIG. 9 is the third schematic diagram of the backlight module according to one embodiment of the present disclosure. If the material of the shell body 22 is plastic, the shell body 22 further comprises a reflector. The reflector covers the interior of the shell body 22. The reflector is configured to reflect part of the light generated by the light-emitting unit 12. For example, the shell body 22 can be made of polycarbonate (PC), ABS (Acrylonitrile Butadiene Styrene plastic), etc. When the material of the shell body 22 is plastic, the process for preparing the shell body 22 can comprise a molding of injection or extrusion. The molding process can achieve mass production and is conducive to reducing costs.

The backlight module 10 further comprises a heat sink 4. The heat sink 4 is disposed between the shell body 22 and the light source substrate 11 and connected to the shell body 22. The heat sink 4 can dissipate heat for the light-emitting units 12. Understandably, the high temperature generated by the heating of the light-emitting units 12 may melt the shell body 22 and the light source substrate 11, and since the cooling performance of the shell body 22 is not obvious when it is made of plastic, the heat sink 4 can be added to dissipate the heat from the light-emitting units 12. Optionally, the heat sink 4 can be provided with a plurality of holes, and each of the light-emitting units 12 can be placed in a hole of the heat sink 4.

Optionally, the material of the heat sink 4 is graphene. The maximum thermal conductivity of graphene is 5300 W·m$^{-1}$·K$^{-1}$, which means that graphene has good thermal conductivity and is conducive to heat transfer of the light-emitting unit 12.

Please refer to FIG. 2 and FIG. 3. The light-emitting units 12 are arranged sequentially along the length direction of the light source substrate 11, and the shell bodies 22 are arranged correspondingly with the light-emitting units 12 along the length direction of the light source substrate 11.

The embodiment of the present disclosure provides a backlight module 10 and a display device 100. The backlight module 10 comprises a light source component 1, a reflecting cover 2, and a light guide plate 3. The light source component 1 comprises a light source substrate 11 and a plurality of light-emitting units 12 disposed on the light source substrate 11. The reflecting cover 2 has a plurality of separated accommodating cavities 21. Each of the accommodating cavities 21 can accommodate one light-emitting unit 12, and the reflecting cover 2 is capable of reflecting the light from light-emitting unit 12. By disposing the separated accommodating cavities 21 in the reflecting cover 2, the light emitted by multiple light-emitting units 12 does not interfere with each other. It is understandable that, on the first aspect, the light from the light-emitting units 12 after entering the light guide plate 3 do not interfere with each other during the transmission of the light guide plate 3, thereby avoiding that the area illuminated by the light-emitting unit 12 in the light guide 3 may be interfered by the light generated by other light-emitting units 12, and thus the uniformity of the light source provided by the backlight module 10 is improved. On the second aspect, when area dimming is applied to the display device 10, an area in the light guide plate which is illuminated by the light-emitting unit 12 provided in the area will not be affected by the light emitted by the light-emitting unit 12 outside the area, thereby improving the contrast of the light generated by the backlight module 10.

In the above embodiments, the description of each embodiment has its own emphasis. For parts that are not described in detail in a certain embodiment, reference may be made to the relevant descriptions of other embodiments.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features.

Embodiments of the present disclosure directed to a backlight module and a display device are illustrated in detail. The embodiments described with reference to the accompanying drawings are exemplary and are intended to be illustrative of the present disclosure, and are not to be construed as limiting the scope of the present disclosure.

What is claimed is:

1. A backlight module, comprising:
   a light source component comprising a light source substrate and a plurality of light-emitting units disposed on the light source substrate;
   a reflecting cover comprising a plurality of shell bodies connected in sequence, wherein each of the shell bodies has a plurality of side walls, the plurality of side walls and the light source substrate are enclosed to form a plurality of mutually separated accommodating cavities, each of the light-emitting units is disposed in one of the accommodating cavities, the accommodating cavities are one to one corresponding to the light-emitting units, and a material of each of the shell bodies is plastic;
   a heat sink disposed between the reflecting cover and the light source substrate, wherein the heat sink is connected to the reflecting cover, and the heat sink is configured to dissipate heat for the light-emitting units; and
   a light guide plate, wherein the light-emitting units and the reflecting cover are located on one side of the light source substrate near the light guide plate, and an interval is provided between the light guide plate and the light source substrate;
   wherein the light emitted by each of the light-emitting units is reflected to the light guide plate by the reflecting cover;
   wherein each shell body is provided with an opening connected with the accommodating cavity; each shell body further comprises a peripheral portion connected to the side walls, abutted against the light guide plate, and disposed at an edge of the opening, and the peripheral portions of the shell bodies are connected to each other to form two tab portions protruding outward from two opposite sides of each of the openings and extending continuously along an entire length of the reflecting cover;
   wherein adjacent two of the accommodating cavities are spaced by a spacer portion connected between the tab portions;
   wherein a thickness of the side wall increases gradually from one side away from the light source substrate to one side near the light source substrate.

2. The backlight module as claimed in claim 1, wherein each of the shell bodies further comprises a bottom wall fixed to the light source substrate and connected to the side walls to form the accommodating cavity, the side walls are disposed at one side of the bottom wall away from the light source substrate, and the bottom wall is provided with a through hole which the light-emitting unit is disposed through.

3. The backlight module as claimed in claim 1, wherein an angle formed by each of the side walls and a side surface of the light guide plate near the light-emitting unit are the same.

4. The backlight module as claimed in claim 3, wherein the side walls are planar or arced.

5. The backlight module as claimed in claim 1, wherein a side surface of the peripheral portion near the light guide plate is parallel to a side surface of the light guide plate near the light-emitting unit.

6. The backlight module as claimed in claim 1, wherein an area of a cross section of the accommodating cavity increases gradually in the direction from the light-emitting unit to the light guide plate.

7. The backlight module as claimed in claim 6, wherein the cross section of the accommodating cavity is a circle or rectangle.

8. A display device, comprising:
   a backlight module comprising:
   a light source component comprising a light source substrate and a plurality of light-emitting units disposed on the light source substrate;
   a reflecting cover comprising a plurality of shell bodies connected in sequence, wherein each of the shell bodies has a plurality of side walls, the plurality of side walls and the light source substrate are enclosed to form a plurality of mutually separated accommodating cavities, each of the light-emitting units is disposed in one of the accommodating cavities, the accommodating cavities are one to one corresponding to the light-emitting units, and a material of each of the shell bodies is plastic;

a heat sink disposed between the reflecting cover and the light source substrate, wherein the heat sink is connected to the reflecting cover, and the heat sink is configured to dissipate heat for the light-emitting units;

a light guide plate, wherein the light-emitting units and the reflecting cover are located on one side of the light source substrate near the light guide plate, and an interval is provided between the light guide plate and the light source substrate; and a liquid crystal module, disposed above the backlight module, for receiving the light from the backlight module;

wherein the light emitted by each of the light-emitting units is reflected to the light guide plate by the reflecting cover;

wherein each shell body is provided with an opening connected with the accommodating cavity; the shell body further comprises a peripheral portion connected to the side walls, abutted against the light guide plate, and disposed at an edge of the opening, and the peripheral portions of the shell bodies are connected to each other to form two tab portions protruding outward from two opposite sides of each of the openings and extending continuously along an entire length of the reflecting cover;

wherein adjacent two of the accommodating cavities are spaced by a spacer portion connected between the tab portions;

wherein a thickness of the side wall increases gradually from one side away from the light source substrate to one side near the light source substrate.

9. The display device as claimed in claim 8, wherein each of the shell bodies further comprises a bottom wall fixed to the light source substrate and connected to the side walls to form the accommodating cavity, the side walls are disposed at one side of the bottom wall away from the light source substrate, and the bottom wall is provided with a through hole which the light-emitting unit is disposed through.

10. The display device as claimed in claim 8, wherein an angle formed by each of the side walls and a side surface of the light guide plate near the light-emitting unit are the same.

11. The display device as claimed in claim 10, wherein the side walls are planar or arced.

12. The display device as claimed in claim 8, wherein a side surface of the peripheral portion near the light guide plate is parallel to a side surface of the light guide plate near the light-emitting unit.

13. The display device as claimed in claim 8, wherein an area of a cross section of the accommodating cavity increases gradually in the direction from the light-emitting unit to the light guide plate.

14. The display device as claimed in claim 13, wherein the cross section of the accommodating cavity is a circle or rectangle.

* * * * *